US005749082A

United States Patent [19]

Sasaki

[11] Patent Number: 5,749,082

[45] Date of Patent: May 5, 1998

[54] DISPLAY SYSTEM INCLUDING DATA DISPLAY FIELDS IN WHICH CHARACTERS ARE SCROLLED

[75] Inventor: Kenji Sasaki, Tokyo, Japan

[73] Assignee: Ricoh Company, Ltd., Tokyo, Japan

[21] Appl. No.: 664,255

[22] Filed: May 17, 1996

Related U.S. Application Data

[63] Continuation of Ser. No. 177,229, Jan. 4, 1994, abandoned, which is a continuation-in-part of Ser. No. 712,090, Jun. 7, 1991, abandoned.

[30] Foreign Application Priority Data

Jun. 11, 1990 [JP] Japan ........................ 2-61461

[51] Int. Cl.[6] .................. G06F 15/00; G09G 5/34

[52] U.S. Cl. ........................ 707/508; 345/124

[58] Field of Search .................. 395/769, 788, 395/793, 341; 345/123, 124

[56] References Cited

U.S. PATENT DOCUMENTS

| | | | |
|---|---|---|---|
| 4,609,919 | 9/1986 | Miyazaki et al. | 345/56 |
| 4,682,161 | 7/1987 | Bugg | 345/130 |
| 4,749,062 | 6/1988 | Tsuji et al. | 187/396 |
| 4,803,478 | 2/1989 | Olsen | 345/124 |
| 4,922,238 | 5/1990 | Aoki et al. | 345/123 |
| 4,970,502 | 11/1990 | Kunikane et al. | 345/56 |
| 5,021,973 | 6/1991 | Hernandez et al. | 395/161 |
| 5,129,056 | 7/1992 | Eagen et al. | 395/161 |
| 5,196,838 | 3/1993 | Meier et al. | 345/118 |
| 5,317,306 | 5/1994 | Abraham et al. | 345/118 |
| 5,333,247 | 7/1994 | Gest et al. | 395/138 |
| 5,384,579 | 1/1995 | Nakasuji et al. | 345/123 |
| 5,386,218 | 1/1995 | Yano et al. | 345/129 |

FOREIGN PATENT DOCUMENTS

| | | |
|---|---|---|
| 0274439 | 1/1988 | European Pat. Off. . |
| 1542726 | 3/1979 | United Kingdom . |

OTHER PUBLICATIONS

"CRT scroller expands 80–character lines to 132", *Electronic Design*, Aug. 2, 1981, vol. 29, No. 17, p. 160.

"Horizontal smooth scrolling for a CRT display" IBM Technical Disclosure Bulletin. vol. 26, No. 4, pp. 2116–2117, Jun. 1, 1984.

*Primary Examiner*—Joseph R. Burwell
*Attorney, Agent, or Firm*—Cooper & Dunham LLP

[57] ABSTRACT

A data display system displays data blocks in a plurality of display fields arranged in a screen, a number of characters displayed in each display field being limited to an allowable number. The data display system includes a display controller for limiting the display in each display field to only the allowable number of characters from a data block of characters, when the number of characters in the data block is greater than the allowable number. The system also includes a selecting unit for selecting a display field from among the plurality of display fields, and a scrolling unit for scrolling the characters displayed by the display controller in the display field selected by the selecting unit.

8 Claims, 12 Drawing Sheets

FIG. 1 (PRIOR ART)

| DATA SET | ITEM No. 1 | ITEM No. 2 | ITEM No. 3 | ITEM No. 4 | ...... |
|---|---|---|---|---|---|
| No. 1 | DATA1-1 | DATA1-2 | DATA1-3 | DATA1-4 | ...... |
| No. 2 | DATA2-1 | DATA2-2 | DATA2-3 | DATA2-4 | ...... |
| No. 3 | DATA3-1 | DATA3-2 | DATA3-3 | DATA3-4 | ...... |
| No. 4 | DATA4-1 | DATA4-2 | DATA4-3 | DATA4-4 | ...... |
| ...... | ...... | ...... | ...... | ...... | |

FIG. 3

| DATASET No. | NAME (ITEM No. 1) | ADDRESS (ITEM No. 2) | TEL. (ITEM No. 3) |
|---|---|---|---|
| 1 | DAVID JACKSON | 5500 WESTAN AREA SUITE 999 | 123-456-7890 |
| 2 | HADSON ANNE | 350 TWIRIGHT AVENEU CTR. No | 555-012-7777 |
| 3 | BILLY SCOTT | 3500 PARKWAY STREET RICOH. | 909-111-0005 |
| 4 | WICKEY HELEN | 801 AMERICANWAY. SUNSHINE | 333-555-0101 |
| | 15 CHARACTERS | 26 CHARACTERS | 12 CHARACTERS |

| DOCUMENT NUMBER | SCHOOL NAME (6 CHARA.) |
|---|---|
| "1" | ABCDEF |
| "2" | ABCDMN |
| "3" | ABCDEF |
| "4" | ABCDOP |

FIG. 12

| | DOCUMENT NUMBER | SCHOOL NAME (6 CHARA.) |
|---|---|---|
| (a) | "1" | A B C D E F |
| (b) | "1" | B C D E F G |
| (c) | "1" | C D E F G H |
| (d) | "1" | D E F G H I |
| (e) | "1" | E F G H I J |
| (f) | "1" | F G H I J K |
| (g) | "1" | G H I J K L |
| (h) | "1" | H I J K L |
| (i) | "1" | I J K L |
| (j) | "1" | J K L |
| (k) | "1" | K L |
| (l) | "1" | L |
| (m) | "1" | |

DISPLAY SYSTEM INCLUDING DATA DISPLAY FIELDS IN WHICH CHARACTERS ARE SCROLLED

CROSS-REFERENCE TO RELATED APPLICATION

This is a continuation of application Ser. No. 08/177,229 filed Jan. 4, 1994, now abandoned, which in turn is a continuation-in-part of application Ser. No. 07/712,090 filed Jun. 7, 1991, now abandoned.

BACKGROUND OF THE INVENTION (1) Field of the Invention

The present invention generally relates to a data display system, and more particularly to a data display system in which characters displayed thereon can be scrolled.

(2) Description of the Related Art

In general, a document processing system in which documents are recorded in a database and data sets corresponding to the documents are displayed on a display unit is known. In this type of document processing system, it is possible for a user to retrieve and ascertain the data sets corresponding to the documents recorded in the database.

A data set corresponding to each document is formed, as shown in FIG. 1, of a plurality of items to each of which a data block representing information belongs. In FIG. 1, the respective data sets are formed of items No. 1, No. 2, No. 3, No. 4 . . . . For example, in a first data set No. 1, data blocks (DATA1-1), (DATA1-2), (DATA1-3), (DATA1-4) . . . belong to the items No. 1, No. 2, No. 3, No. 4 . . . . To display the data blocks belonging to all the items of each data set in a screen of the display unit, a number of bytes (characters) capable of being displayed in an item is limited to a predetermined value which is referred to as an allowable value. In this case, the data sets are displayed on the display unit in a format as shown in FIG. 1. However, if a number of bytes of a data block belonging to an item of a data set is greater than the allowable value for the item, it is impossible to display all characters represented by the data block of the item in the screen of the display unit at once.

Thus, in a conventional document processing system, when the above case occurs, a display format of the respective data blocks belonging to the items of the data sets is changed so that the data block having the large number of bytes can be displayed on the display unit. That is, when the number of bytes of the data block exceeds the allowable value, the allowable value is increased so that the larger number of bytes can be displayed.

However, when the allowable value for one item is increased, allowable values for other items must be decreased or data blocks for other items must be removed from the screen of the display unit.

In addition, as the number of bytes of each data block is not constant, it is difficult to decide the allowable value for each item of the data sets. If the allowable values for the items of the data sets are large, intervals at which the data blocks of the data sets are displayed are large. In a case where each of the data blocks has particularly small number of bytes (characters), a space between the data blocks displayed on the screen is large. As a result, it is troublesome for the user to ascertain the data blocks of the data sets on the display unit. Furthermore, if the allowable values for the items of the data sets are large, the number of the data sets which can be displayed in the screen of the display unit is decreased. That is, the amount of information which can be displayed in one screen of the display unit is reduced.

To prevent the amount of information displayed on the display unit from being reduced, a data display system in which all the data sets in the screen of the display unit can be scrolled in a horizontal direction and/or a vertical direction has been proposed. The technique regarding the scrolling of the screen is disclosed, for example, in U.S. Pat. No. 4,609,919, U.S. Pat. No. 4,803,478, U.S. Pat. No. 4,870,502, and U.S. Pat. No. 5,129,056. However, when the all the data sets in the screen are scrolled to find a data block, other data blocks are out of the screen. Thus, to ascertain a large number of data blocks of the data sets in the screen, the user must repeat scrolling operations.

SUMMARY OF THE INVENTION

Accordingly, a general object of the present invention is to provide a novel and useful data display system in which the disadvantages of the aforementioned prior art are eliminated.

A more specific object of the present invention is to provide a data display unit in which a large amount of information can be displayed in a screen of a display unit without changing the format in which data blocks are displayed.

Another object of the present invention is to provide a data display unit in which a large amount of information can be displayed in a screen of a display unit without scrolling all data blocks in the screen.

The above objects of the present invention are achieved by a data display system for displaying data blocks in a plurality of display fields arranged in a screen, a number of characters displayed in each display field being limited to an allowable number, the data display system comprising: display control means for displaying in each display field only the allowable number of characters out of characters representing a data block when a number of characters representing the data block is greater than the allowable number; selecting means for selecting a display field from among the plurality of display fields; and scrolling means for scrolling the characters displayed by the display control means in the display field selected by the selecting means.

The above objects of the present invention are also achieved by a data display system for displaying data blocks in a plurality of display fields arranged in a screen, a number of characters displayed in each display field being limited to an allowable number, the data display system comprising: display control means for displaying in each display field only the allowable number of characters; selecting means for selecting a display field from among the plurality of display fields; data providing means for providing display data to the display control means, the display data being formed of a data block to be displayed in the display field selected by the selecting means and other data; and scrolling means for scrolling the characters displayed by the display control means in the display field selected by the selecting means so that all characters representing the display data provided by the data providing means are displayed in the display field selected by the selecting means.

According to the present invention, since only characters displayed in the selected display field are scrolled, a large amount of information can be displayed in a screen without changing the format of displayed data and without scrolling all data blocks in the screen.

Additional objects, features and advantages of the present invention will become apparent from the following detailed description when read in conjunction with the accompanying drawings.

BRIEF DESCRIPTION OF THE DRAWINGS

FIG. 1 is a diagram illustrating a structure of each of data sets corresponding to documents recorded in a database.

FIG. 3 is a diagram illustrating data sets displayed in a screen.

FIG. 12 in parts of (a), (b), (c), (d), (e), (f), (g), (h), (i), (j), (k), (l) and (m) is a time chart illustrating an example of a variation of title displayed by a display unit.

DESCRIPTION OF THE PREFERRED EMBODIMENTS

A description will now be given of a document processing system to which a data display system according to an embodiment of the present invention.

Figure 2:
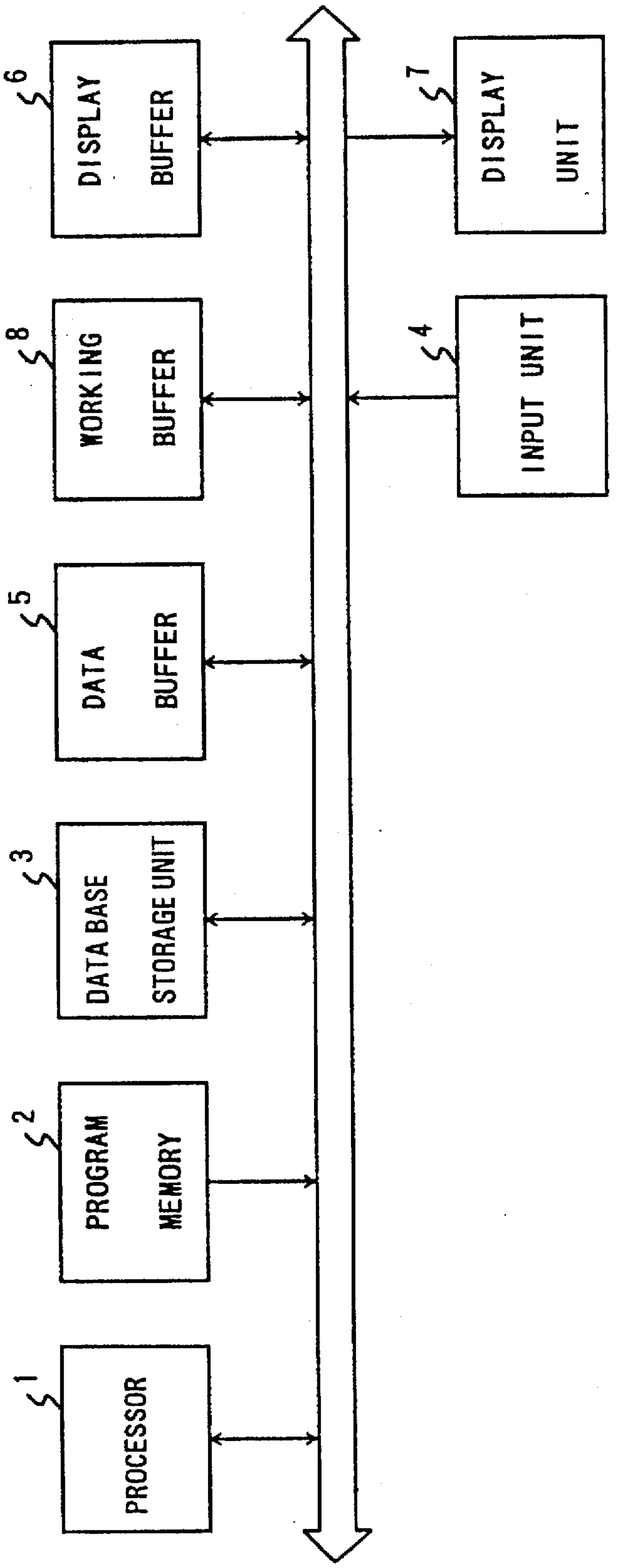
FIG. 2 is a block diagram illustrating a document processing system to which a data display system according to an embodiment of the present invention.

Referring to FIG. 2, which shows an essential structure of a document processing system. The document processing system has a processor 1, a program memory 2, a data base storage unit 3, an input unit 4, a data buffer 5, a display buffer 6, a display unit 7 and a working buffer 8 all of which are connected to each other by a bus. The processor 1 controls this whole system. Programs used in this system, such as control programs for the processor 1, are stored in the program memory 2. The data base storage unit 3 stores a data base for documents. The data base is formed of a plurality of data sets each of which are formed of a plurality of items, as shown in FIG. 1. To retrieve the data base, the data sets forming the data base are copied from the data base storage unit 3 to the data buffer 5. Information to be displayed is copied from the data buffer 5 to the display buffer 6, and the information stored in the display buffer 6 is displayed by the display unit 7 such as a CRT display unit. Information to be processed is copied from the data buffer 5 to the working buffer 8, and the information stored in the working buffer 8 is processed in a predetermined procedure. The processed information in the working buffer 8 is supplied, for example, to the display unit 7 via the display buffer 6, so that the processed information is displayed by the display unit 7.

In a case where this system is provided with a data base regarding, for example, an address book, the data base is formed as follows.

Each data set of the data base is formed of items of:

1 Name;

2 Address;

3 Tel (Telephone number);

4 Fax (Facsimile number); and

5 Work (Occupation).

The items "Name", "Address", "Tel", "Fax" and "Work" are respectively identified by item Nos. 1, 2, 3, 4 and 5. Each of the data sets corresponds to a person. In a data set corresponding to a person named, for example, Mr.Scott, data blocks belong to the above items as indicated in Table-1.

TABLE 1

| ITEM | DATA BLOCK |
|---|---|
| Name | Billy Scott |
| Address | 3500 Parkway Street Ricoh, NewYork,N.Y |
| Tel | 909-111-0005 |
| Fax | 159-753-0147 |
| Work | American Football Player |

The data sets of the data base are displayed by the display unit 7 as shown in FIG. 3. In FIG. 3, data Nos. 1, 2, 3 and 4 identifying the data sets and data blocks belonging to the three items "Name", "Address" and "Tel" out of the five items are displayed. In each data set, display fields having lengths for fifteen characters (bytes), twenty six characters (bytes) and twelve characters (bytes) are respectively assigned, as the allowable number of characters, to the data blocks belonging to the items "Name", "Address" and "Tel", so that information regarding the three items of each data set can be displayed in one screen of the display unit 7. Thus, if the number of characters (bytes) representing a data block is greater than the allowable character number of a display field for the data block, only the allowable number of characters of the data block is displayed in the display field. In the data set corresponding, for example, to a person named Mr. Scott, only twenty six characters (the allowable character number of characters) of his address are displayed in the displayed field, but the remaining characters thereof are not displayed.

A display item No. block for display fields of each item, as shown in Table-2, is stored in the data buffer 5.

TABLE 2

| |
|---|
| MASTER ITEM No. 1 |
| OTHER ITEM No(s). 5 |

The display item No. block indicates the data blocks to be displayed in the display field for the items identified by the master item No. The display item No. block shown in Table-2 indicates that the data blocks belonging to the items "Name" and "Work" identified by the master item No. 1 and another item No. 5 are to be displayed in the display field for the item "Name" identified by the master item No. 1. The information in the display item No. block can be updated by operations of the input unit 4.

In each display field, the characters displayed therein can be scrolled. A process for scrolling characters is shown in FIGS. 4 and 5, and a flow of information in the process is indicated in FIG. 6.

Figure 4:
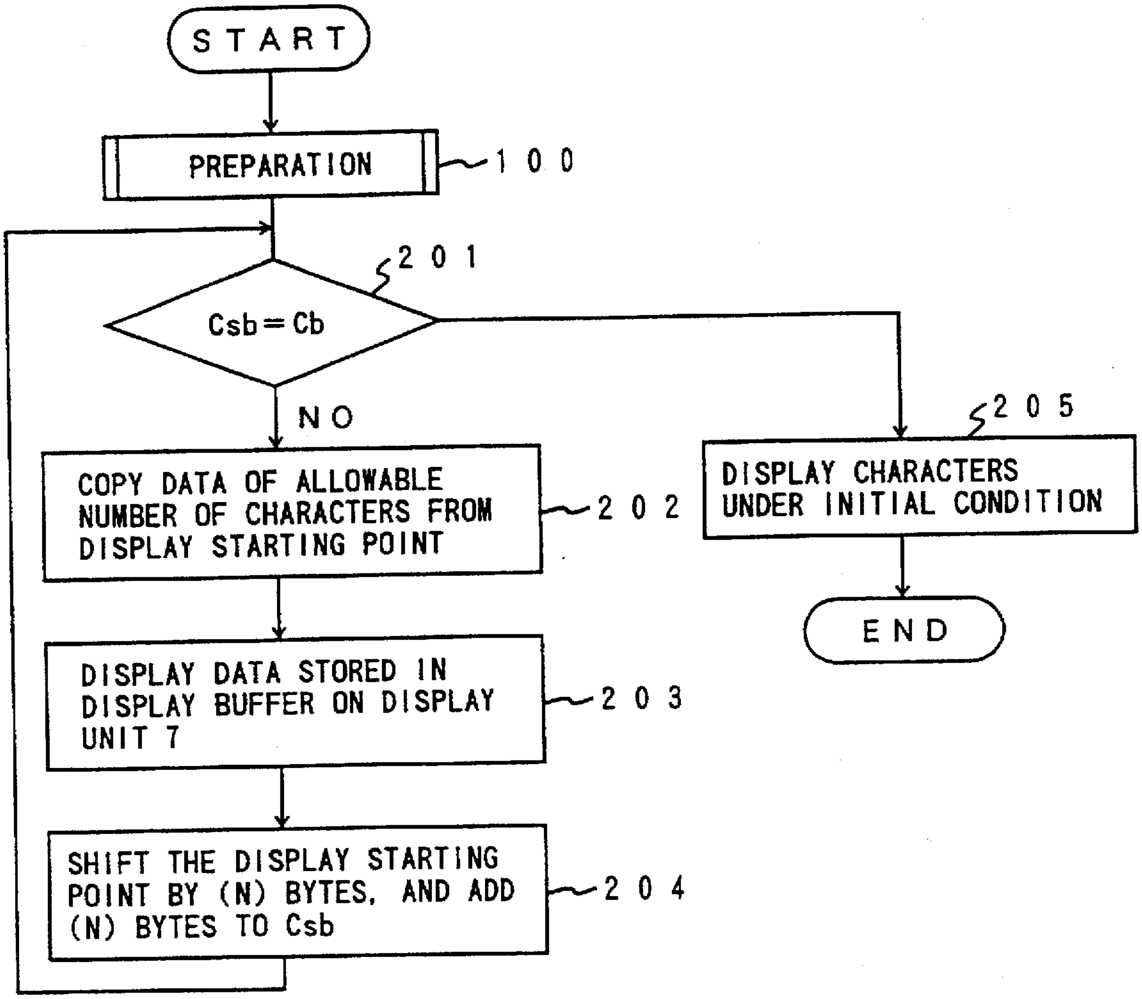
FIG. 4 is a flow chart illustrating a process for scrolling characters.
Figure 5:
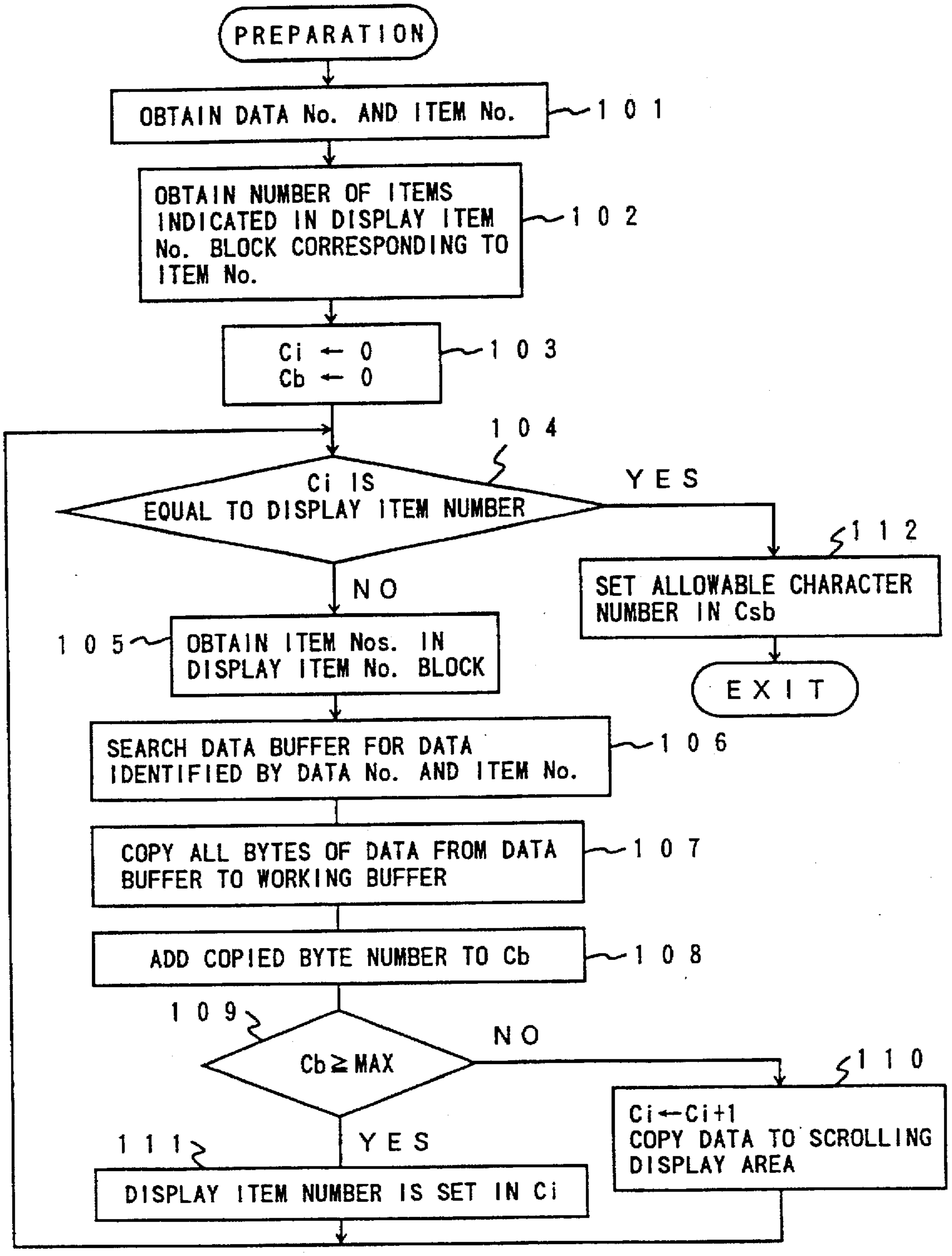
FIG. 5 is a flow chart illustrating a preparation process.

Referring to FIG. 4, first, a preparation process 100 is performed in accordance with the flow chart shown in FIG. 5.

Figure 6:
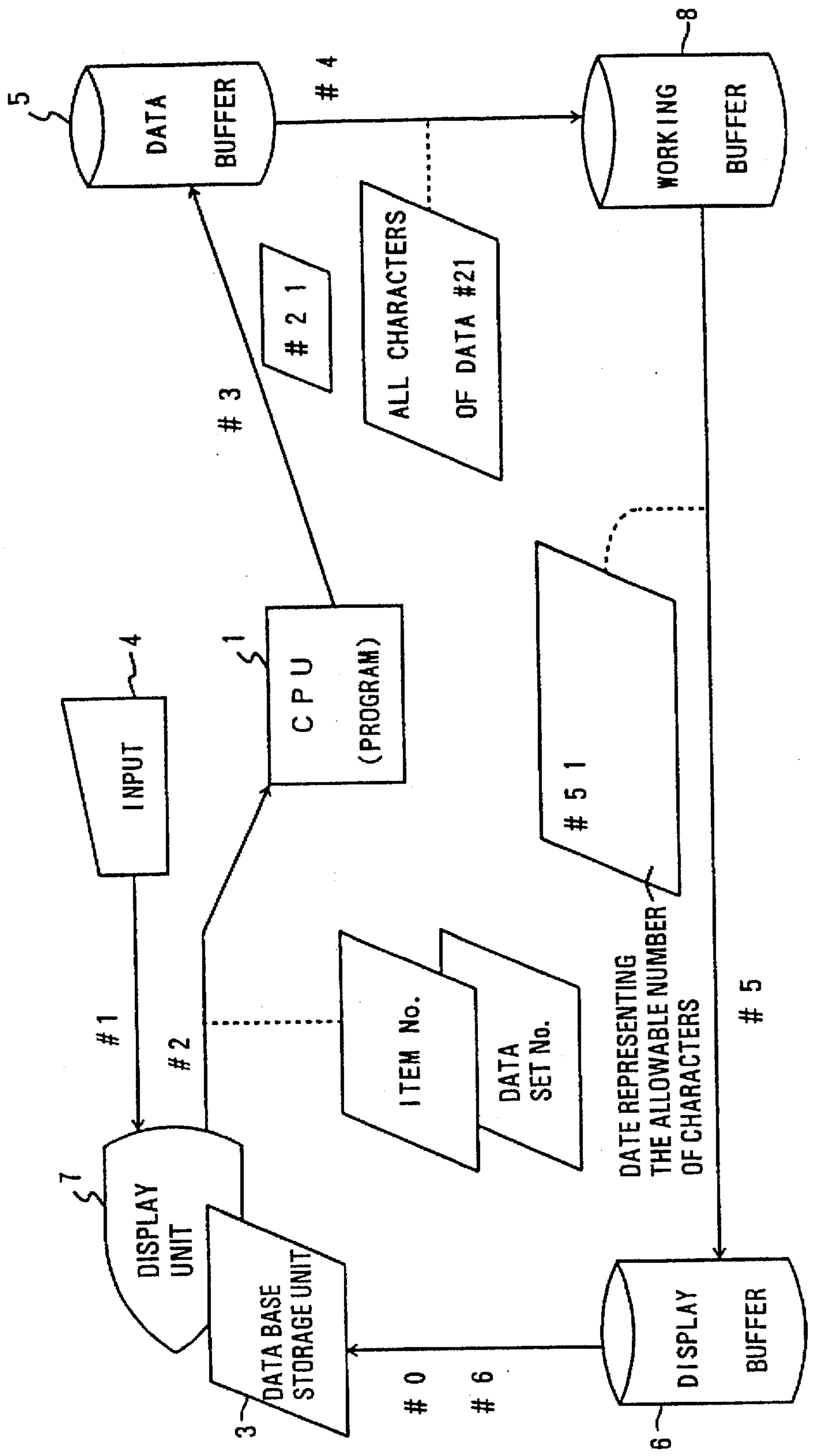
FIG. 6 is a diagram illustrating a flow of information in the process for scrolling the characters.

Referring to FIG. 5, when a data set No. identifying a data set and an item No. identifying a display field in which characters are to be scrolled are input from the input unit 4 (#1 in FIG. 6), the processor 1 obtains, in step 101, the data No. and the item No. as coordinate data (#2 in FIG. 6). As a result, a display field identified by the coordinate data is selected. In a case where a user wishes to ascertain a complete address of Mr. Scott in the screen as shown in FIG. 3, the data set No. 3 identifying a data set for Mr. Scott and the item No. 2 identifying the item "Address" are input from the input unit 4, so that a display field for the address of Mr. Scott selected.

An example of Mr. Scott will be described below.

In step 102, the processor 1 obtains a number of items included in the display item No. block. In this example, the number of items is one, corresponding to the item "Address" of the data set for Mr. Scott (data set 3). In step 103, an item counter $C_i$ and a byte counter $C_b$ are reset to "0". After this, it is determined, in step 104, whether or not a count value of the item counter $C_i$ is equal to the item number of items obtained in step 102. Since the item counter $C_i$ has been reset to "0" in step 103, the process proceeds to step 105. In step 105, the processor 1 obtains an item No. from the display item block. In this case, the item No. 2 (the master item No. in the display item block) identifying the item "Address" is obtained. After this, in step 106, the processor 1 searches the data buffer 5 for data identifying the data set No. 3 and the item No. 2. In step 107, all bytes (characters) of the data obtained in step 106 are copied from the data buffer 5 to the working buffer 8 (#3 and #4 in FIG. 6). In this case, all bytes of the data representing the complete address "3500 ParkWay Street Ricoh,NewYork,N.Y" of Mr. Scott are stored in the working buffer 8. In step 108, the number of bytes of the data copied from the data buffer 5 to the working buffer 8 is added to a value of the byte counter $C_b$. Then, it is determined in step 109 whether or not the value of the byte counter $C_b$ reaches a maximum value corresponding to a maximum number of bytes which can be stored in the working buffer 8. If the value of the byte counter $C_b$ has not reached the maximum value yet, the item counter $C_i$ is incremented by one, and the data in the working buffer 8 is copied to a scrolling display area of the working buffer 8, in step 110. After this, the process returns to step 104, and it is determined whether or not the count value of the item counter $C_i$ is equal to the number of items included in the display item No. block. In this exemplary case where only the master item No. is included in the display item No. block (i.e., the number of items is equal to one), it is determined that the count value of the item counter $C_i$ is equal to the number of items included in the display item No. block. As a result, the process proceeds to step 112. In step 112, the number of bytes (characters) which are displayed in the selected display field is set in a scroll byte counter $C_{sb}$. In this case, as the allowable character number assigned to the display field for the item "Address" is equal to twenty six, the number of twenty six is set to the scroll byte counter $C_{sb}$.

After the above preparation process 100 is completed, the process proceeds to step 201 in FIG. 4.

In step 201, the processor 1 determines whether or not the value of the scroll byte counter $C_{sb}$ is equal to the value of the byte counter $C_b$. Since the scroll byte counter $C_{sb}$ is initially set to the allowable character number (twenty six) and the value of the byte counter $C_b$ is equal to the number of all bytes of data (the address of Mr. Scott) to be displayed, it is determined that the value of the scroll byte counter $C_{sb}$ is less than the value of the byte counter $C_b$. As a result, in step 202, data of the number of bytes corresponding to the allowable character number from a display starting point is copied from the scrolling display area of the working buffer 8 to the display buffer 6 (#5 in FIG. 6). The data stored in the display buffer 6 is then supplied to the display unit 7 (#6 and #0) and is displayed in the selected display field, in step 203. Thus, in this example, twenty six characters from a head of the address of Mr. Scott are displayed in the display field as shown in FIG. 3. After this, in step 204, the display starting point is shifted by N bytes, and the N is added to the value of the scroll byte counter $C_{sb}$.

The above process of steps 201–204 is repeated, so that the characters displayed in the selected display field for the address of Mr. Scott is scrolled by N characters. In a case where N is set to "1", the address of Mr. Scott is scrolled as follows.

1) 3500 ParkWay Street Ricoh,
2) 500 ParkWay Street Ricoh,N
3) 00 ParkWay Street Ricoh,Ne
4) 0 ParkWay Street Ricoh,New
5) ParkWay Street Ricoh,NewY
6) ParkWay Street Ricoh,NewYo
7) arkway Street Ricoh,NewYor
8) rkway Street Ricoh,NewYork
9) kway Street Ricoh,NewYork,
10) Way Street Ricoh,NewYork,N
11) ay Street Ricoh,NewYork,N.
12) y Street Ricoh,NewYork,N.Y When, due to the scrolling of the characters, all the bytes (characters) of the data representing the address of Mr. Scott have been displayed in the selected display field, the value of the scroll byte counter $C_{sb}$ reaches the value of the byte counter $C_b$. As a result, the process proceeds from step 201 to step 205, so that the displayed characters in the selected display field returns to the initial state. That is, in this example, twenty six characters from the head of the address of Mr. Scott are displayed (see the character in No. 1 above)).

In a case where a plurality of items are indicated in the display item No. block as shown in Table-2, steps 104–110 in the preparation process shown in FIG. 5 are repeated a plurality times corresponding to the number of items indicated in the display item No. block. When the value of the item counter $C_i$ reaches the number of items indicated by the display item No. block, the allowable value for the selected display field is set in the scroll byte counter $C_{sb}$, in step 112.

In an example in which the name of Mr Scott and his occupation are displayed in the display field for the item "Name", the data set No. 3 identifying the data set for Mr. Scott is input to this system, and the master item No. 1 identifying the item "Name" and another item No. 5 identifying the item "Work" are set in the display item No. block, as shown in Table-2. In this example, all bytes of the data representing the name of Mr. Scott and all bytes of the data representing his occupation are copied from the data buffer 5 to the working buffer 8 in the preparation process 100 shown in FIG. 5. After the preparation process is completed, the process shown in FIG. 4, so that fifteen characters (the allowable character number of characters) displayed in the display field for the item "Name" of the data set identified by the data set No. 3 (for Mr. Scott) are scrolled as follows (N=1).

1) Billy Scott
2) illy Scott A
3) lly Scott Am
4) ly Scott Ame
5) y Scott Amer
6) Scott Ameri
7) Scott Americ
8) cott America
9) ott American
10) tt American
11) t American F
12) American Of -continued

| |
|---|
| 13) American Foo |
| 14) American Foot |
| 15) American Footb |
| 16) American Footba |
| 17) American Footbal |
| 18) merican Football |
| 19) erican Football |
| 20) rican Football P |
| 21) ican Football Pl |
| 22) can Football Pla |
| 21) an Football Play |
| 22) an Football Playe |
| 23) n Football Player |

After characters representing the name of Mr. Scott and his occupation have been displayed, the displayed characters in the selected display field returns to the initial state. That is, only the name of the Mr. Scott is displayed in the display field for the item "Name" of the data set identified by data set No. 3 (see the character display in No. 1 above)).

In the preparation process 100, if the number of bytes of data to be displayed is too large, the count value of the byte counter $C_b$ reaches a maximum number of bytes which can be stored in the working buffer 8. In this case, the process proceeds from step 109 to step 111. That is, the count value of the item counter $C_i$ is set to the number of items indicated in the display item No. block. As a result, the process proceeds from step 111 to step 112 through step 104, and the preparation process 100 is completed.

According to the above embodiment, only in the display field identified by the data set No. and the item No., both of which are input from the input unit 4, are the characters scrolled. Thus, a large amount of information can be displayed in a screen, without changing the format of displayed data blocks, under a condition in which it is easy for the user to ascertain all data sets displayed in the screen.

In the above embodiment, data regarding the format of scrolling, which data corresponds to information in the display item No. block, may be also recorded in a disk unit. When the data base is activated, the data recorded in the disk unit is loaded into the data buffer 5 of this system. The scrolling process is automatically performed based on the loaded data.

Figure 7A:
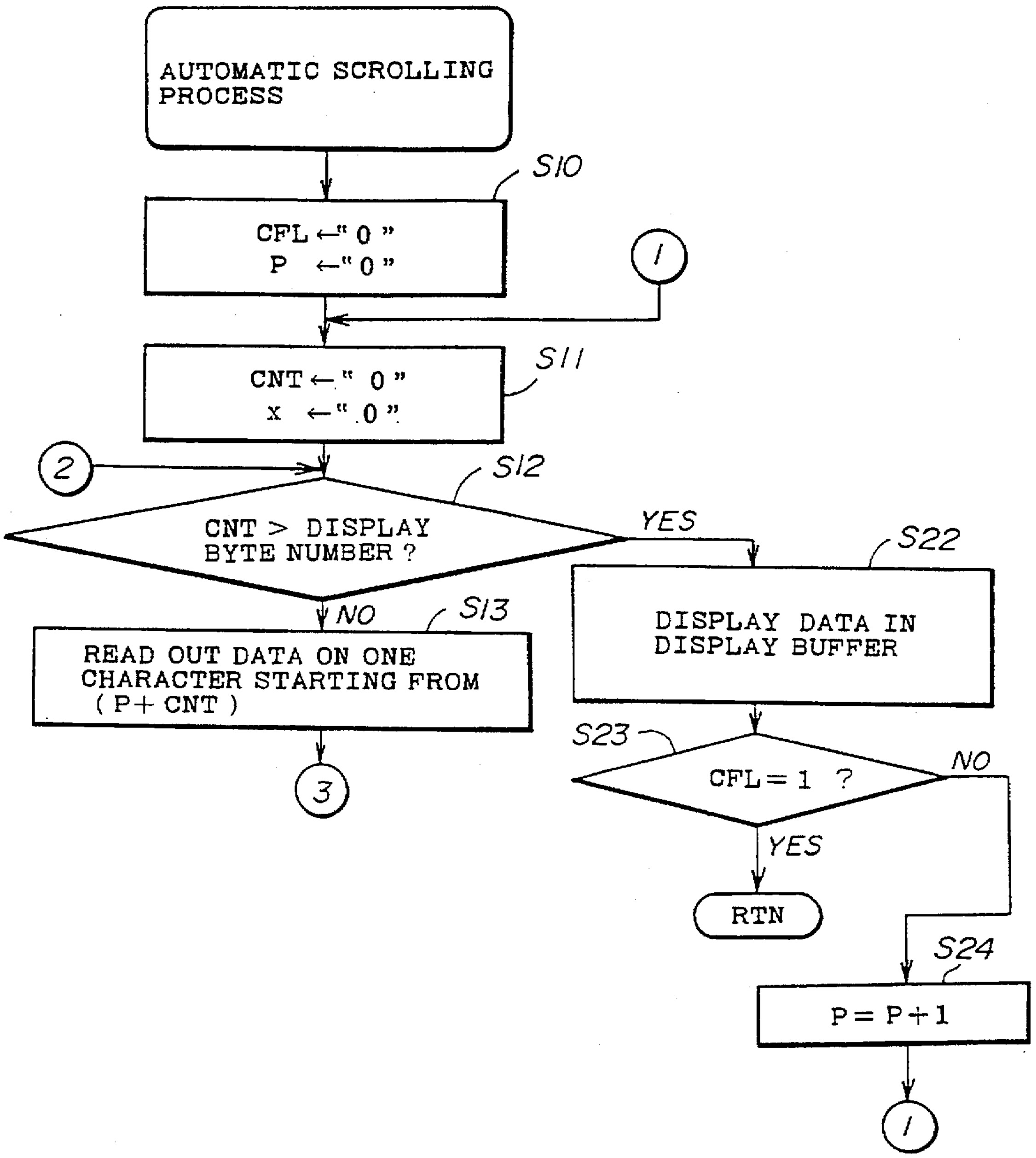
FIGS. 7A and 7B are flow charts illustrating another example of a process for scrolling characters.
Figure 7B:
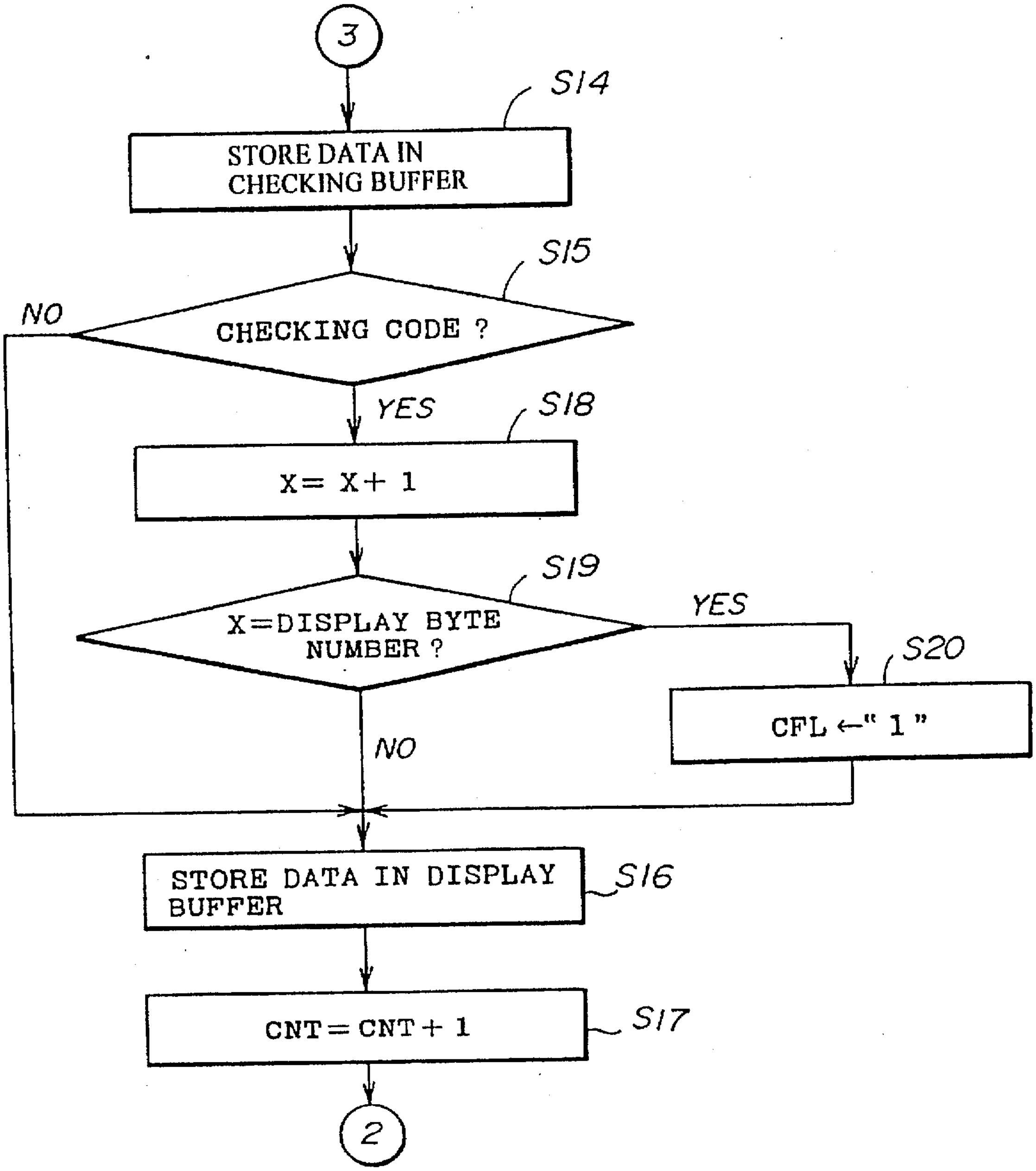

The scrolling process may be also performed in accordance with flow charts shown in FIGS. 7A and 7B.

Referring to FIGS. 7A and 7B, step S10 initially sets a check flag CFL at "0". The check flag CFL describes a result of checking whether or not the data transferred to the display buffer 6 is entirely formed of the checking codes (predetermined character codes). Step S10 also sets the read starting point P in the data buffer 5 at, for example, "0". After the checking flag CFL and the read starting point P are respectively set at "0", the processor 1 carries out a process for reading out the display data from the data buffer 5 to transfer the display data to the display buffer 6. That is, the following process is carried out.

Step S11 initially sets a data counter value CNT at "0" and a detecting counter value X at "0". The data counter value CNT describes the number of bytes of the data read out from the data buffer 5. The detecting counter value X describes the number of times that the checking code is detected. Step S12 then determines whether or not the number of bytes corresponding to the data counter value CNT is greater than the number of bytes corresponding to the display field. The number of bytes corresponding to the display field is hereinafter referred to as a display byte number DS (corresponding to the above allowable character number). When the number of bytes corresponding to the data counter value CNT is not greater than the display byte number (N in step S12), the data having bytes for one character starting from a point defined by (P+CNT) in the data buffer 5 is read out from the data buffer 5 in step S13. The data read out from the data buffer 5 in step S13 is stored in the wording buffer 8 in step S14. Then, step S15 determines whether or not the data stored in the wording buffer 8 is formed of the checking code (the character code). When the data stored in the working buffer 8 is not formed of the checking code but is instead formed of bytes corresponding to one character out of the original title data (N in step S15), the data having bytes for one character is transferred to and stored in the display buffer 6. Then, step S17 increments the data counter value CNT by one, and the process returns to step S12. After this, steps S12 to S17 are repeated until step S12 determines that the number of bytes corresponding to th data counter value CNT is greater than the display byte number DS. While steps S12 to S17 are being repeated, (P+CNT) is increased by one for each step and the data on one character starting from the position corresponding to (P+CNT) is successively read out from the data buffer 5 and transferred via the working buffer 8 to the display buffer 6.

According to the above process, the data on every character starting from the read starting out position P (initially "0") and shifting towards the tail end of the title is successively read out from the data buffer 5 and stored in the display buffer 6. Then the number of bytes of the data stored in the display buffer 6 becomes the display byte number DS. In this cases, step S12 determines that the number of bytes corresponding to the data counter value CNT is greater than the display bytes number DS (N in step S12). Then, a process for transferring the data from the data buffer 5 to the display buffer 6 is completed, and the process proceeds to step S22.

The display data is read out from the display buffer 6 and supplied to the display unit 7, in step S22. Then the characters corresponding to the display data are displayed by the display unit 7. After step S22, step S23 determines whether or not the checking flag CFL is "1". When step S23 determines that the checking flag CFL is not "1" (N in step S23), the read starting point P is shifted by one character. That is, the read starting point P is incremented by "1". The process then returns to step S11, and steps S12 to S17 and S22 are carried out so that the process for transferring the next data of the display byte number DS from the data buffer 5 to the display buffer 6 is performed. In this case, as the read starting point P is shifted by one character in the data buffer 5, the next display data starting from the read starting point P shifted by one character is read out from the data buffer 5 and transferred to the display buffer 6. The next display data stored in the display buffer 6 is then displayed by the display unit 7 in step S22 so that the displayed characters are shifted by one character with respect to those obtained by preceding process for displaying the characters for the display data.

In the above process for displaying characters, there is a case where the number of bytes of the data starting from the reading out position P and shifted toward a point corresponding to the tail end of the title in the data buffer 5 is less than the display byte number DS. In this case, one or a plurality of the checking codes are added to the data read out from the data buffer so that the number of bytes the data supplied to the display buffer 6 is equal to the display byte number DS. Each checking code is formed of a predetermined character code. When the checking code is stored in the working buffer 8 in step S14, step S15 determines that the data on one character read out from the data buffer 5 is the checking code. In this case, step S18 increments the detecting counter value X by one. Step S19 then determines whether or not the detecting counter value X is equal to the display byte number DS. When step S19 determines that the detecting counter value X is less than the display byte number DS, step S16 transfers the data on the checking code from the data buffer 5 to the display buffer 6. Until the checking counter value X becomes equal to the display byte number DS, the process for transferring the data from the data buffer 5 to the display buffer 6 in accordance with steps S12 to S17 is repeatedly carried out. At this time, the process for displaying the display data stored in the display buffer 6 is carried out in accordance with steps S22 to S24 and S11. When the data counter value CNT and the detecting counter value are respectively equal to the display byte number DS, the data stored in the display buffer 6 is formed of only the checking codes. That is, in this case, the data stored in the display buffer 6 does not include the bytes for the title data. Thus, step S19 determines that the detecting counter value X is equal to the display byte number DS. When this occurs, step S20 sets the checking flag CFL at "1".

After a tail end character of the title specified by the data stored in the display buffer 6 is scrolled on the display unit 7, step S23 determines that the checking flag CFL is equal to "1". At this time, the automatic strolling process is completed.

A description will now be given of an example of changing data stored in the display buffer 6 and displayed character.

Figure 8:
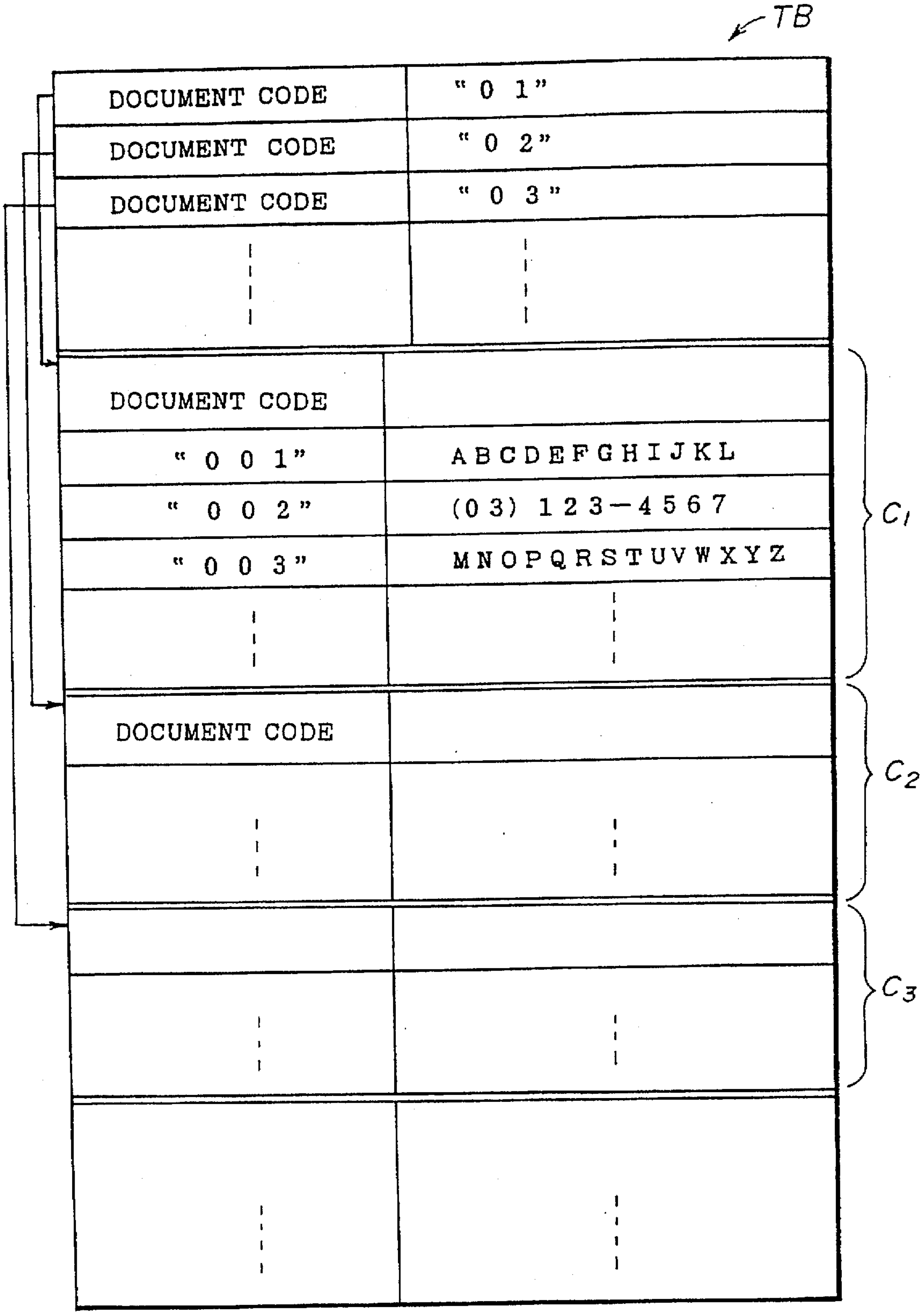
FIG. 8 is a diagram illustrating a retrieval table.

FIG. 8 shows a retrieval table TB formed in the data base. The retrieval table TB is used for retrieving the document recorded in the data base 3. In FIG. 8, document codes "01", "02", "03", . . . are provided in the retrieval table TB. Title information storage areas C1, C2, C3, . . . respectively correspond to the document codes "01", "02", "03", For example, in the title information storage area C1, items "001", "002", "003", . . . are provided. Title data (data block) "ABCDEFGHIJKL" specified by the first item "001", title data (data block) "(03)123-4567" specified by the second item "002", and title data (data block) "MNOPQRSTUVWXYZ" specified by the third item "003" are stored in the title information storage area C1 of the data base 3.

The display buffer 6 has a capacity for six characters. Thus, the maximum number of characters which can be displayed in the display field is six. That is, the display byte number corresponds to six characters.

Figures 9, 10:
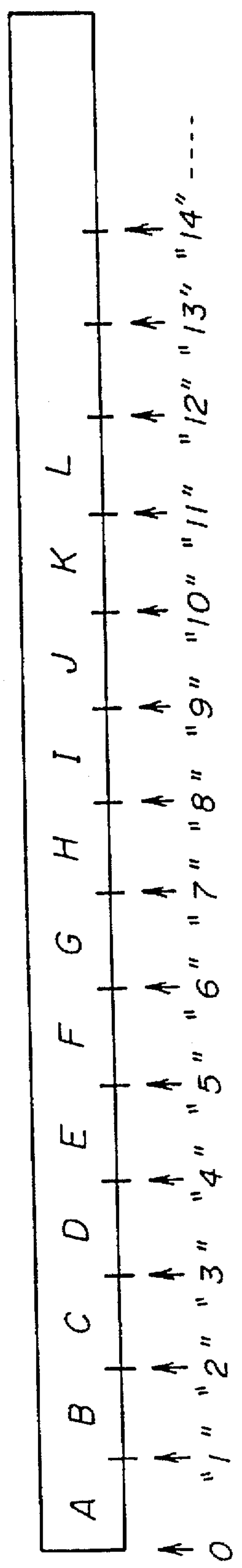
FIG. 9 is a diagram illustrating an example of a list showing titles of documents.
FIG. 10 is a diagram illustrating an example of original title data stored in a data buffer.

When an instruction that a title of a document is displayed by the automatic scroll process described above is supplied to the processor 1, first, a list of titles as shown in FIG. 9 is displayed by the display unit 7. Each title in the list displayed by the display unit 7 is formed of six characters. The user operates the input unit 4 while looking at the list displayed by the display unit 7. When the document code "01" and the title information code "001" corresponding to the document number "1" are input from the input unit 4, the processor 1 reads out the title data "ABCDEFGHIJKL" specified by the document code "01" and the title information code "001" from the data base storage unit 3 based on the retrieval table TB as shown in FIG. 8. The title data "ABCDEFGHIJKL" read out from the data base storage unit 3 is stored in the data buffer 5 as shown in FIG. 10. The title data stored in the data buffer 5 is formed of bytes for 14 full-sized characters . The title data for 14 full-sized characters is used as the original title data. The capacity of the data buffer 5 is such that bytes for 60 half-sized characters, for example, can be stored therein.

After the original title data "ABCDEFGHIJKL" is stored in the data buffer 5, the processor 1 carries out the automatic scrolling process.

Figure 11:
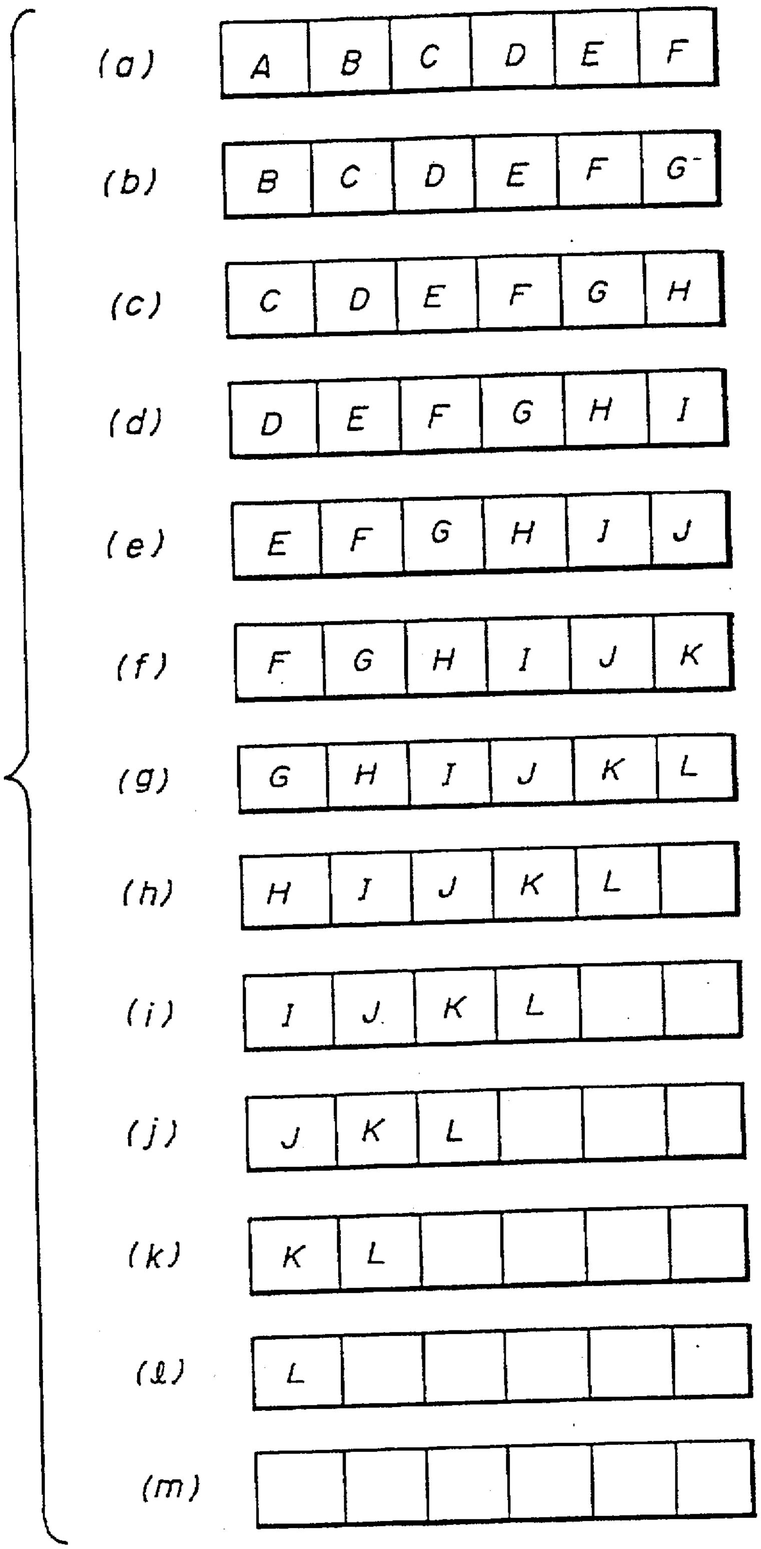
FIG. 11 in parts of (a), (b), (c), (d), (e), (f), (g), (h), (i), (j), (k), (l) and (m) is a time chart illustrating an example of a variation of data in a display buffer.

First, the processor 1 sets the read starting point P in the data buffer 5 at "0", and transfers the data on the display byte number DS starting from the read starting point P from the data buffer 5 to the display buffer 6. That is, the data on six characters starting from the reading point P at "0" is transferred to the display buffer 6. Thus, the data on six characters "ABCDEF" starting from the leading end of the title is stored in the display buffer 6, as shown in FIG. 11 (*a*). At this time, the data shown in FIG. 11 (*a*) is transferred to the display unit 7, and a picture shown in FIG. 12 (*a*) is displayed by the display unit 7. Next, the read starting point P is shifted by one character toward the tail of the title. Thus, the data on six characters "BCDEFG" starting from the second character "B" is stored in the display buffer 6 , as shown in FIG. 11 (*b*). The picture displayed by the display unit 7 is changed from that shown in FIG. 12 (*a*) to that shown in FIG. 12 (*b*) so that one character is shifted. In FIGS. 12 (*b*) to (*m*), titles "DOCUMENT No" and "SCHOOL NAME" are omitted for the sake of simplicity.

After this, when the read starting point P is successively shifted by one character, the data on six characters stored in the display buffer 6 is changed as shown in FIGS. 11 (*c*) to (*m*). The picture displayed by the display unit 7 is thus successively changed as shown in FIGS. 12 (*c*) to (*m*). That is, the characters displayed by the display unit 7 are scrolled character by character. Thus, the whole title having characters larger than the maximum number of characters to be displayed in the display field can be displayed without changing the display format. The amount of information displayed in one picture on the display unit 7 can be increased.

In a process for displaying characters on the display unit 7, as has been described above, when the reading out position P is shifted to "7", the number of characters of the data which is read out from the data buffer 5 becomes "5". That is, the number of characters of the data read out from the data buffer 5 is less than six, which is the maximum number of characters capable of being displayed in the display field. Thus, in this case, the checking code for one character is added to the data on five characters which is read out from the data buffer 5, so that the data on six characters is obtained. The data on six characters is then transferred to the display buffer 6. When the data to which the checking code for one character is added is transferred to the display buffer 6, the detecting counter value X is incremented by "1". As this detecting counter value X=1 is less than the value corresponding to the display byte number DS, the checking flag CFL is maintained at "0". Then, when the read starting point P is successively shifted to "8", "9", . . . , the detecting counter value X successively becomes "2", "3", . . . . Then, when the read starting point P reaches "12", the detecting counter value X becomes "6". That is, the detecting counter value X is equal to the value corresponding to the display byte number DS. AT this time, the checking flag CFL is set at "1". That is, when the picture displayed by the display unit 7 is changed to that shown in FIG. 12 (*m*), the checking flag CFL is set at "1". When the processor 1 detects the checking flag CFL of "1", the processor 1 ends the automatic scrolling process.

When the processor detects the checking flag CFL of "1", the automatic scrolling process may be also restarted. In this case, the picture displayed by the display unit 7 returns from a state shown in FIG. 12 (*m*) to a state shown in FIG. 12 (*a*). The picture is then successively changed as shown in FIGS. 12 (*a*) through (*m*) again.

The present invention is not limited to the aforementioned embodiments, and variations and modifications may be made without departing from the scope of the claimed invention.

What is claimed is:

1. A data display system for displaying data blocks in a plurality of display fields arranged in a screen, said data display system comprising:

selecting means for selecting at least one display field from among said plurality of display fields;

processing means for retrieving from a data base a data block associated with said at least one display field and for processing said data block for subsequent display;

display control means for limiting the display in said at least one display field to a predetermined allowable number of characters when the number of characters in said data block associated with said at least one display field is greater than the predetermined allowable number; and scrolling means for automatically continually scrolling the characters displayed by said processing means in the display field selected by said selecting means, without further user input after said display field selection until all of the characters in the data block have been displayed, when the number of characters in said data block is greater than the predetermined allowable number.

2. The data display system as claimed in claim 1, wherein said data display system displays a plurality of data sets each of which is formed of items to which the data blocks belong, and wherein said selecting means has input means for inputting a data number identifying a data set and an item number identifying an item, so as to display the predetermined allowable number of characters in the display field identified by the item number and the data number.

3. The data display system as claimed in claim 2, wherein the display fields identified by the item number and the data number are arranged and displayed in a horizontal direction in the screen.

4. The data display system as claimed in claim 3, wherein said scrolling means scrolls characters in the horizontal direction.

5. A data display system for displaying data blocks in a plurality of display fields arranged in a screen, said data display system comprising:

selecting means for selecting a plurality of display fields;

processing means for retrieving from a data base data blocks including a plurality of characters, wherein each retrieved data block corresponds to one of said plurality of display fields selected by said selecting means, and for processing said retrieved data blocks for subsequent display in each corresponding display field;

display control means for limiting the display in each of said plurality of display fields to a predetermined allowable number of characters for each display field; and scrolling means for automatically continually scrolling said plurality of characters of each displayed data block having a number of said plurality of characters that exceeds said predetermined allowable number, without further user input after said display field selection until all of said plurality of characters in each data block have been displayed in said corresponding display field.

6. The data display system as claimed in claim 5, wherein said data display system displays a plurality of data sets each of which is formed of items to which the data blocks belong, and wherein said selecting means has input means for inputting a data number identifying a data set and an item number identifying an item, so as to display the allowable number of characters in the display field identified by the item number and the data number.

7. The data display system as claimed in claim 6, wherein the display field identified by the item number and the data number are arranged and displayed in a horizontal direction in the screen.

8. The data display system as claimed in claim 7, wherein said scrolling means scrolls characters in the horizontal direction.

* * * * *